Aug. 9, 1960 P. D. JOHNSON 2,948,184
CONCAVE GRATING SPECTROGRAPHIC INSTRUMENT
Filed July 3, 1957
PRIOR ART.
Fig. 1.
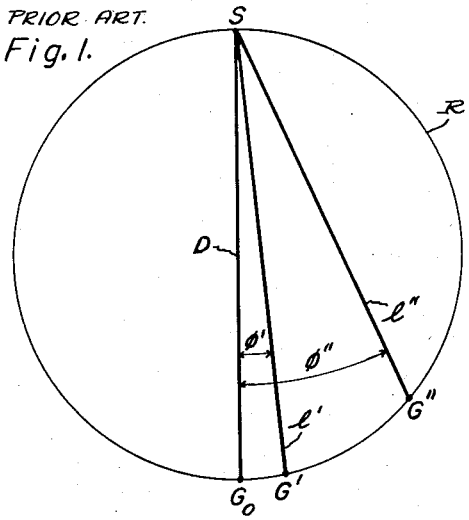
Fig. 2.
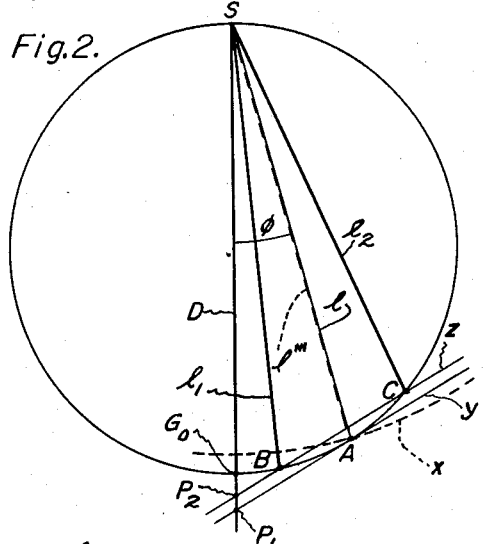
Fig. 3.
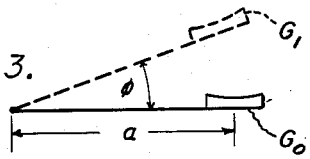
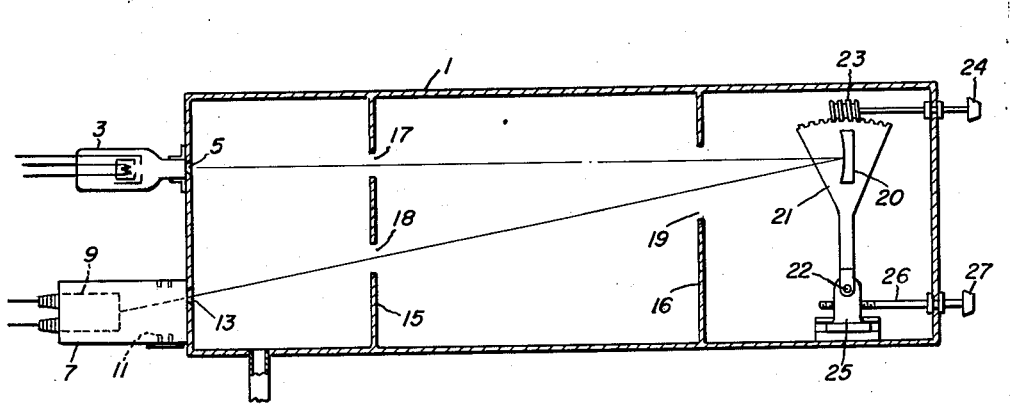
Fig. 4.
Inventor:
Peter D. Johnson,
by Richard R. Brainard
His Attorney.

United States Patent Office 2,948,184
Patented Aug. 9, 1960

2,948,184
CONCAVE GRATING SPECTROGRAPHIC INSTRUMENT

Peter D. Johnson, Schenectady, N.Y., assignor to General Electric Company, a corporation of New York Filed July 3, 1957, Ser. No. 669,722
6 Claims. (Cl. 88—14)

The present invention relates to new and improved spectrographic instruments. More particularly, the invention relates to improved diffraction grating mountings particularly useful in recording spectrometers and monochromators.

In concave diffraction grating spectrographic instruments a beam of electromagnetic radiation enters the instrument from a suitable source at an entrance slit and is incident upon a ruled concave diffraction grating. The radiation is dispersed into its spectral components and viewed or recorded upon a photographic plate. In recording spectrometers and monochromators the photographic plate is replaced by an exit slit and only an extremely small portion of the spectrum is viewed at any particular time. In most mountings, the entrance slit, the diffraction grating and the photographic plate or exit slit are all located upon the Rowland circle, a theoretical circle, the diameter of which is equal to the radius of curvature of the diffraction grating.

In recording spectrographs and monochromators, the portion of the spectrum viewed at any time may be varied, so that the spectrum may be scanned, by moving either slit or the grating along the Rowland circle. It is a characteristic of the concave grating that as it moves along the Rowland circle, due to its azimuthal orientation and longitudinal distance with respect to the slit, the image of the entrance slit received at the exit slit is always in perfect focus. In order that the foregoing be accomplished, however, the instrument must be extremely complicated and cumbersome, since great care must be exercised to maintain the member which is moved on the Rowland circle at all times. As a result of the foregoing, such instruments are extremely expensive and quite large in size. For certain applications in which the user of the instrument is interested only in being able to scan a limited portion of the spectrum at one time, or in which optimum resolving power is not required, the foregoing type instrument is unnecessarily accurate, expensive and large. Thus, if only a portion of the spectrum is utilized or high resolution is not needed, the foregoing type instrument is not necessary.

Accordingly, one object of the present invention is to provide a diffraction grating mounting for spectrographic instruments which is simple and economical.

A further object of the invention is to provide a simple diffraction grating mounting for limited range spectrographic instruments having a resolving power which is as satisfactory as much more complicated instruments over a limited spectral range.

A further object of the invention is to provide a greatly simplified easily operated concave grating spectrographic instrument.

In accord with one aspect of the present invention, I provide a concave grating spectrographic instrument with fixed entrance and exit slits on one segment of a Rowland circle and a concave diffraction grating located for normal-incidence operation near a second segment of the Rowland circle which is almost diametrically opposed to the entrance and exit slits. Rather than being maintained tangent to a Rowland circle at all times, the grating is rotatable about a line parallel to the grating rulings, perpendicular to the plane of the Rowland circle and external of the Rowland circle and removed from the geometrical center of the grating. As the grating is rotated, both the azimuthal orientation of the grating to the slits and the longitudinal distance therefrom change. At two points along the rotational path of the grating, these parameters are precisely equal to the corresponding parameters as if the grating were moved about the Rowland circle. At the wavelength corresponding to these two points, the image of the entrance slit at the exit slit is in perfect focus. At wavelengths corresponding to any other given position of the grating on its rotational path, the image of the entrance slit at the exit slit is in focus to within any chosen value, dependent upon the spectral range included. Thus, by providing a simple construction by which the grating may be rotated a small angle about a line perpendicular to the plane of the Rowland circle, perfect, or near perfect, focus is attained over a limited wavelength range. The resultant instrument is less cumbersome, less expensive and more easily operated than conventional instruments in which either grating or slit is moved along the Rowland circle.

The novel features believed characteristic of the invention are set forth in the appended claims. The invention itself, together with further objects and advantages thereof may best be understood by reference to the following description, taken in connection with the drawings in which:

Figure 1 is a schematic diagram of the geometry of a conventional concave grating spectrographic instrument, Figure 2 is a schematic diagram of the geometry of a concave grating spectrographic instrument constructed in accord with the present invention, Figure 3 is a simplified drawing of the manner in which a concave grating is rotated in accord with the present invention, and Figure 4 is a horizontal cross sectional view of a vacuum ultraviolet monochromator constructed in accord with the present invention.

In Figure 1 of the drawing, there is illustrated a geometrical configuration which is descriptive of the Rowland type mounting, one mounting conventionally used in concave grating spectrographs. In Figure 1, the entrance and exit slits are, for the sake of clarity in presentation, located at the same point S on the Rowland circle R having a diameter D. Let it be assumed that the wavelength radiation to be imaged at the exit slit is to be changed by changing the position of the grating along the Rowland circle. At normal incidence, when the grating is at position $G_0$, diametrically opposite point S the radiation received at the exit slit is the same as that which enters through the entrance slit. As the grating is moved to a position $G^1$, a distance $l^1$ from point S, the chord $l^1$, defines an angle $\phi^1$, which is the angle of incidence and diffraction, with the line D or the line of normal incidence. The image received at the exit slit is then of a wavelength $\lambda^1$, and is in perfect focus since both the slits and the grating are on the Rowland circle. At the point $G^1$, not only is the distance $l^1$ from point S to the grating different from the distance D, but the azimuthal orientation of the grating with respect to the slits is different than it was at $G_0$. As the grating is moved to a position $G^{11}$, a distance $l^{11}$ from point S, the chord $l^{11}$ defines an angle $\phi^{11}$, a different angle of incidence and refraction than $\phi^1$, thus causing a second wavelength $\lambda^{11}$ to be focused at the exit slit. At $G^{11}$ the distance and azimuthal relationship of the grating with respect to the slits is unique for that position. This is true of all positions along the Rowland circle in either direction from the normal incidence position $G_0$.

In Figure 2 of the drawing there is illustrated a geometrical configuration for a spectrographic instrument approximating that of Figure 1 of the drawing which describes the operation of an instrument constructed in accord with the present invention. In Figure 2, a Rowland circle R, having a diameter D and entrance and exit slits at S is the same as in Figure 1. One method which might be utilized for approximating the focus in a spectrometer which is attained as in Figure 1 by moving the grating around the Rowland circle, is to maintain the grating at a fixed position on the circle and to pivot the grating about a line parallel to the grating rulings, tangent to the ruled surface, intersecting the Rowland circle, and perpendicular to the plane of the circle, namely a line normal to the drawing at point A in Figure 2. This pivoting would have the effect of simulating the changing azimuthal relationship of the grating with respect to the slits as the grating is moved about the Rowland circle. Such an expedient, however, would not change the distance of the grating from the slits and hence, for all positions of the grating except one, the image of the entrance slit received at the exit slit is defocused. Dotted line X through point A is a plot of an equivalent locus of points which defines the equivalent position of the grating with respect to the Rowland circle that would produce the same effect upon the image received at the exit slit by virtue of this expedient. As may be seen from Figure 2, the image at the exit slit would be in perfect focus only when, on the equivalent diagram, the grating is at a point equivalent to position A on line X. At all positions to the right of A the equivalent position of the grating would be too far from the slits for perfect focus, and at all positions to the left of A the grating would be at a distance too close to the slits for perfect focus.

In accord with the present invention, however, rather than pivoting the grating about a line tangent to the rulings, at the center of the grating intersecting the Rowland circle and perpendicular to the plane thereof, the grating is rotated about a line parallel thereto and removed from the Rowland circle and from the grating itself, so that the grating, as it moves through its rotational course, not only changes its azimuthal orientation with respect to the exit and entrance slits, but also changes its linear distance from the slits, more closely approximating the conditions existing between the grating and the slits, as if the grating were moved about the Rowland circle to produce perfectly focused images. In Figure 2, line Y represents an equivalent locus of points for rotation about a point $P_1$ a given distance $c_1$ equal to $G_0P_1$ from the Rowland circle and indicates the equivalent positions of the grating along the Rowland circle. It should be appreciated, however, that in rotating the grating, rather than moving it along the Rowland circle, the position of the grating is not defined by line Y but rather that line Y is a locus of positions of the grating with respect to the Rowland circle which give an equivalent result at the exit slit, to the rotation of the grating in accord with the present invention. As may be seen from Figure 2, line Y touches the Rowland circle at only one point, namely point A at which it is tangent to the circle. Therefore, only at point A is the image produced at the exit slit in perfect focus and at all other points along the line the image is somewhat defocused due to the fact that for all points, other than A, along line Y, the grating is farther from the slits than it should be for perfect focus. It will, however, be noted that line Y is a vast improvement over line X which is obtained by merely pivoting the grating about its geometrical center.

Line Z on Figure 2, represents the locus of equivalent positions of the grating with respect to the Rowland circle, corresponding to a more suitable displacement of the pivot point $P_2$ a distance $c_2$ equal to $G_0P_2$ from the Rowland circle. As may be seen from Figure 2, line Z intersects the Rowland circle at points B and C so that at the points along its rotational path corresponding to points B and C in the figure, the image produced at the exit slit having wavelengths of $\lambda_1$ and $\lambda_2$ respectively is in perfect focus. At all other points along path of rotation of the grating, the image at the exit slit is slightly out of focus because, between B and C the grating is too close to the slits, and at all other points along line Z, the grating is too far away from the slits. It will be noted, however, that the difference in linear distance $l-l'''$ in the path length $l'''$ between the slit and the equivalent line at any point, and the slit and the same azimuthal distance $l$ extending to the Rowland circle, is very small. In practice, this slight difference in optical path length results in a slight defocusing which is entirely tolerable in devices utilized for a number of purposes, and can over limited spectral ranges be made less than the limitations imposed by the resolving power of the grating. The locations of points $P_1$ and $P_2$, it may be seen from Figure 2, are the intersections of line D with lines Y and Z respectively, the lines drawn through the perfect focus points. Points $P_1$ and $P_2$ are therefore in the plane of the Rowland circle.

It is to be noted that, in accord with the present invention, the Rowland circle is not defined by the position of the grating, but the diameter thereof is fixed by the grating curvature and the Rowland circle in Figure 2 is fixed in position by the location of points S and $G_0$.

In Figure 3 of the drawing there is shown a schematic representation of the rotational displacement of the grating G along its rotational path. In Figure 3 the angle $\phi$ which is equal to the angle $\phi$ in Figure 2, is the angle of incidence and diffraction of the grating mounting for position $G_1$ measured with respect to the normal incidence position $G_0$. Since the angle $\phi$ is equal in Figures 3 and 2 it may be seen that the azimuthal relationship of the grating for a given position along the rotational path in Figure 3 is equal to the azimuthal relationship of the grating along the line Z in Figure 2, which is a locus of equivalent positions plotted with respect to the Rowland circle. The distance ($a$) is the radius of rotation of the grating in accord with the present invention. Utilizing Figures 2 and 3 of the drawing, one may readily compute the desired radius of rotation ($a$) and displacement ($c$) of the pivot point P from the Rowland circle which should result in a chosen amount of resolution for a given range of wavelengths in any particular portion of the electromagnetic spectrum which is to be examined by a spectrographic instrument produced in accord with the present invention.

The radius of rotation of the grating is defined by the relationship $$a = \frac{\lambda_t D}{2d} \quad (1)$$

The radial distance outward from the Rowland circle at which point P should be located for a given spectral range is defined by the relationship $$c = \frac{a^2}{2d} - \frac{\Delta\lambda^2 D}{32 d^2} \quad (2)$$

The difference in the linear distance $l'''$ from the grating to the slits utilizing the rotational method in the present invention and the radial distance $l$ from the slits to an equivalent position on the Rowland circle which would image the same wavelength in a Rowland mounting is given by the relationship $$l - l''' = \frac{a}{2}\left(\frac{\lambda}{d} - \frac{a}{D}\right) - \frac{D}{8d^2}\left(\lambda^2 - \frac{\Delta\lambda^2}{4}\right) \quad (3)$$

where:

$a$ = the radius of rotation of the grating
$D$ = the diameter of the Rowland circle
$d$ = the separation of the grating rulings
$c + D$ = the distance from point S to the pivot point when the grating is mounted in accord with the present invention to obtain perfect focus at wavelengths $\lambda_1$ and $\lambda_2$
$\Delta\lambda = \lambda_2 - \lambda_1$ $\lambda_t = \frac{\lambda_1 + \lambda_2}{2}$ = the wavelength imaged at the exit slit for a position intermediate between points B and C in Figure 2

From Equations 1, 2 and 3 above, several physical characteristics of devices constructed in accord with the present invention are readily apparent. Thus, from Equation 1, it is evident that since $d$ and $D$ are fixed for any given diffraction grating, the value of $a$ (the radius of rotation of the grating) varies directly as the central wavelength of the wavelength band desired to be scanned by rotating the grating about the pivot point. From Equation 2 it may be seen that for any given radius of rotation of the grating, the width of the wavelength band scanned by rotating the grating about the pivot point varies as the square root of the distance the pivot point is located from the Rowland circle. Thus, the width of the wave length band to be scanned may be varied merely by moving the pivot point with respect to the Rowland circle for any given radius of rotation. Finally, from Equation 3 it may be noted that the amount of defocusing inherent for any particular operational mode of instruments constructed in accord with the present invention increases as the wavelength band which is scanned is increased. Thus, the narrower the wavelength band scanned, the more closely is perfect focusing approximated over the entire band.

For the sake of clarity in presentation, two simplifications have been made in the drawings illustrating the invention. It has first been assumed that the entrance and exit slits are both located at point S, positioned diametrically opposite the normal incidence position of the grating upon the Rowland circle. It has further been assumed that pivot point P is located along an extension of the diameter D of the Rowland circle connecting points S and $G_0$. Neither of the foregoing simplified assumptions constitute actual limitations upon the invention. Thus, for example, the entrance and exit slits need not be located at the same point and neither need be located at point S. In practice, the slits may be located at any position along the Rowland circle which would cause the instrument to be operated in the normal-incidence mode, as opposed to the grazing-incidence mode. For the purposes of the present specification, a spectrographic instrument may be denominated as operating in the normal incidence mode when the angle of incidence differs from the angle of diffraction by no greater than 20°.

With respect to the location of pivot point P, this point may be located at any position external of the Rowland circle along an arc subtended by the radius $D+c$ with center of curvature at point S, whether or not either of the slits is located at point S. So long as the foregoing criteria are satisfied the foregoing equations are valid and may be utilized to compute the geometric configuration of instruments constructed in accord with the present invention, particularly dimensions $a$ and $c$.

From the foregoing it may be seen that the geometry of a spectrographic instrument constructed in accord with the present invention is fully described by specifying the radius of rotation about which the grating is to be rotated and the location of the point P about which the grating is to be rotated with respect to the location of point S. Utilizing the foregoing equations as design specifications, one may choose a radius of rotation and a location for the grating pivot point to obtain any suitable spectral width to be scanned and to obtain any degree of approximation of perfect focusing.

As an example of one calculation of a geometry for an instrument constructed in accord with the present invention, let it be assumed that a grating is used which has a grating space of $1.67 \times 10^{-4}$ centimeters and that the curvature of the grating establishes a Rowland circle having a diameter of 100 centimeters. Assume further that it is desired to scan a spectral region between two points of perfect focus (points B and C on Figure 2) which is 1,000 Angstroms in width and that this point is to be located symmetrically about a central point or $\lambda_t$ of 1800 Angstroms. From Equation 1 above $(a)$—the radius of rotation of the grating—should be 5.4 centimeters. From Equation 2 above, it may be seen that point P should be located .01344 centimeters outside the Rowland circle. To determine the amount of defocusing which is encountered within this spectral range utilizing the values of $(a)$ and $(c)$, derived above, Equation 3 may be utilized, in which case it is found that the difference between $l$ and $l'''$ is computed to be 0.0111 centimeter. Since the optical path from the entrance slit to the grating and back to the exit slit includes this distance twice, the image of the entrance slit is actually in focus at a point 0.0222 centimeter behind the exit slit. If the entire grating is ten centimeters wide (an average figure) the foregoing defocusing results in a widening of the entrance slit image at the exit slit by $$\frac{0.0222}{100} \times 10 = 0.00222 \text{ centimeter}$$

Since such a grating possesses a dispersion of 170 A.U. per centimeter, the loss in resolution due to the amount of defocusing present is equal to $170 \times 0.00222 = 0.38$ A.U at $\lambda_t$ (1800 Angstrom units). Therefore, the focus obtained using the configuration of the present invention is as good or better than 0.38 Angstrom units from a spectral range of 1100 Angstrom units to 2500 A.U. Using the configuration of the present invention, this slight amount of defocusing is all that is suffered in order to obtain the highly desirable results of simplicity in construction and ease of operation which the present grating mounting offers as compared with a Rowland mounting in which the diffraction grating must be moved about an accurately machined track which approximates the Rowland circle.

The angle through which the grating must be rotated in order to scan a desired portion of the spectrum is not very great, but is dependent upon the band scanned and the diameter of the Rowland circle as well as the grating ruling space. To scan the 1000 A.U. band described above with the parameters described above requires a motion of the grating through an angle of 1° 43'. A rotational angle of 10° would encompass all the spectral range that would be desired in practical devices.

Devices constructed in accord with the present invention are useful in observing radiation from 500 to 20,000 A.U. The most useful range, however, is from 800 to 3000 A.U. Utilizing the same type grating used in the foregoing example a range of grating rotation radii from 2.4 to 9.0 centimeters is sufficient to cover this spectral range.

In Figure 4 of the drawing, there is illustrated in horizontal cross section a vacuum ultraviolet monochromator illustrative of the spectrographic devices which may be constructed in accord with the present invention. The device of Figure 4 includes a hollow cylindrical casing 1 having at one end thereof a source of radiation 3 which may conveniently be a hydrogen discharge lamp connected to the main body of casing 1 through entrance slit 5 which is adjustable to any desired width conveniently from .1 to 1 millimeter. At the same end of casing 1 there is located a sensing device 7 including a phototube 9 and a sample holder 11 for holding a sample to be spectrographically examined connected to the main body of casing 1 through an exit slit 13 which may also conveniently be adjusted to widths from approximately .1 to 1 millimeter. A pair of baffles 15 and 16 enclose the entire central portions of the monochromator tube with the exception of apertures 17 and 18 in baffle 15 and aperture 19 in baffle 16 which are in the path of light directed from light source 11 to the concave diffraction grating and thence to the sensing member. At the other end of the monochromator body 1 there is located a concave diffraction grating 20 mounted upon grating holder 21 pivotally rotatable about pin 22 and caused to rotate by a worm and rack gear arrangement 23 adjustable by knob 24 which may conveniently comprise a micrometer adjustment for accurately rotating diffraction grating 20 about pin 22. Pin 22 is integral with pin block 25 into which shaft 26 is threaded. By rotating shaft 26 by means of knob 27, the longitudinal position of pin 22 within casing 1 may be changed to effectively change the location of point P and the length of dimension C in Figure 2 of the drawing. If desired, a similar arrangement may be used to adjust the position of pin 22 transversely in casing 1.

In devices constructed in accord with the present invention it will be appreciated that the entire mechanisms for rotating grating 20 and for changing the longitudinal or transverse position of pin 22 may be replaced by any suitable mechanical equivalents for performing the same functions. The invention is, therefore, not limited to the illustrated means.

In the particular monochromator demonstrated in Figure 4, in order to eliminate all light absorbing media from the optical path length, the entire device is operated at a low pressure of hydrogen of approximately 2000 microns which is the operating pressure of hydrogen discharge lamp 11. This expedient conveniently eliminates the necessity of entrance and exit windows, adjacent the entrance and exit slits, which would absorb a small but appreciable amount of the radiation passing therethrough. The dimensions of the monochromator and the location of the entrance and exit slits and the diffraction grating which can conveniently be chosen are such that the center of the geared portion of the grating holder 21 engages the worm gear 23, the wavelength of the light imaged at the exit slit is approximately $\lambda_t$ or the central wavelength of the band of wavelengths which may be scanned by pivoting the diffraction grating about pin 22. As the grating is rotated so as to move either forward or rearward, the departure from perfect focus decreases and the grating approaches a point of perfect focus corresponding to points B and C on Figure 2 of the drawing, equivalent to the positioning of the diffraction grating on the Rowland circle. As the grating is rotated forward or rearward past these points the focusing of the image at the exit slit again departs from perfect focus corresponding to the portions of line Z, Figure 2, which are outside of the Rowland circle. For most applications, however, a very substantial wavelength band may be scanned in accord with the present invention with departure from perfect focus which is quite compatible with reasonable resolution.

While the invention has been described with respect to certain specific embodiments, it will be appreciated that many modifications and changes may be made by those skilled in the art without departing from the spirit of the invention. I intend, therefore, by the appended claims, to cover all such modifications and changes as fall within the true spirit and scope of the invention.

What I claim as new and desire to secure by Letters Patent of the United States is:

1. A concave grating spectographic instrument in which a preselected wavelength band of electromagnetic radiation may be viewed with a preselected degree of resolution approaching perfect focus; comprising entrance and exit slits located upon a Rowland circle for normal incidence operation; a concave grating mounted upon a grating holder, said grating holder being rotatable about an axis parallel to the rulings of said grating, external of the Rowland circle and removed from the geometrical center of the grating, the distance of said axis from the Rowland circle defining the width of said preselected wavelength band; and means for rotating said grating about said axis so that the locus of the equivalent positions of the grating with respect to the Rowland circle intersects the Rowland circle at two points, to cause the wavelength radiation imaged at said exit slit to vary over said preselected wavelength band.

2. A concave grating spectrographic instrument comprising entrance and exit slits located upon the Rowland circle for normal incidence operation, and a concave grating mounted for rotation in the plane of the Rowland circle about an axis parallel to the rulings of said grating, external of the Rowland circle, and removed from the geometrical center of the grating, the locus of equivalent positions of the grating with respect to the Rowland circle intersecting the Rowland circle at two points.

3. A concave grating spectrographic instrument in which a preselected wavelength band of electromagnetic radiation may be viewed with a preselected degree of resolution approaching perfect focus; comprising entrance and exit slits located upon a Rowland circle for normal incidence operation; a concave grating mounted upon a grating holder, said grating holder being rotatable about an axis parallel to the rulings to said grating, external of the Rowland circle and removed from the geometrical center of the grating, the distance of said pivot point from the Rowland circle defining the width of said preselected wavelength band; means for rotating said grating about said axis so that in its rotational path the grating is on the Rowland circle at least one point to cause the wavelength radiation imaged at said exit slit to vary over said preselected wavelength band; and means for changing the position of said axis to vary the width of said wavelength band.

4. A concave grating spectrographic instrument comprising entrance and exit slits located upon a Rowland circle for normal incidence operation, a concave grating mounted for rotation in the plane of the Rowland circle about an axis parallel to the rulings on said grating, external of the Rowland circle and removed from the geometrical center of the grating, the locus of equivalent positions of the grating with respect to the Rowland circle intersecting the Rowland circle at two points, and means for rotating the grating along its rotational path to vary the wavelength of radiation imaged at the exit slit.

5. A concave grating spectrographic instrument comprising entrance and exit slits located upon the Rowland circle for normal incidence operation, a concave grating mounted for rotation in the plane of the Rowland circle about an axis parallel to the rulings on said grating, external of the Rowland circle and removed from the geometrical center of the grating, the locus of equivalent positions of the grating with respect to the Rowland circle intersecting the Rowland circle at two points, means for rotating the grating along its rotational path to vary the wavelength of radiation imaged at the exit slit, and means for changing the position of said axis with respect to the Rowland circle to change the width of a preselected wavelength range imaged at the exit slit by the rotation of the grating.

6. A concave grating monochromator comprising a casing having a rectangular horizontal cross section, an entrance slit and an exit slit located in the same plane in one end of said casing, a source of electromagnetic radiation adjacent said entrance slit, a sensing device sensitive to electromagnetic radiation adjacent said exit slit, a concave grating mounting assembly mounted adjacent the end of said casing opposite from said slits and including a grating holder rotatably mounted about an axis, a concave grating mounted upon said grating holder and in the horizontal plane including said slits, means for changing the position of said axis relative to said slits, and means for rotating said grating holder about said axis.

References Cited in the file of this patent

FOREIGN PATENTS

| 720,177 | Germany | Apr. 27, 1942 |
| 1,133,557 | France | Nov. 19, 1956 |

OTHER REFERENCES

"A Grating Spectrograph for Use in Qualitative Analysis," Von Arx, pages 407–410 of Journal of Chemical Education, September 1942.